(12) United States Patent
Raffalt

(10) Patent No.: US 7,562,571 B2
(45) Date of Patent: Jul. 21, 2009

(54) DEVICE AND METHOD FOR DETECTING MATERIAL BY MEANS OF GRAVITATIONAL FIELD ANALYSIS

(75) Inventor: Felix Raffalt, Hausach (DE)

(73) Assignee: Vega Grieshaber KG, Wolfach (DE)

( * ) Notice: Subject to any disclaimer, the term of this patent is extended or adjusted under 35 U.S.C. 154(b) by 338 days.

(21) Appl. No.: 11/584,850

(22) Filed: Oct. 23, 2006

(65) Prior Publication Data
US 2007/0157724 A1 Jul. 12, 2007

Related U.S. Application Data

(62) Division of application No. 11/075,045, filed on Mar. 7, 2005, now Pat. No. 7,240,550.

(30) Foreign Application Priority Data
Dec. 7, 2004 (DE) .................... 10 2004 058 909

(51) Int. Cl.
*G01F 23/00* (2006.01)

(52) U.S. Cl. ................................ 73/314; 73/313

(58) Field of Classification Search ............... 73/313, 73/314
See application file for complete search history.

(56) References Cited

U.S. PATENT DOCUMENTS

| | | | |
|---|---|---|---|
| 1,796,150 | A | 3/1931 | Hamer |
| 3,424,006 | A | 1/1969 | Dicke et al. |
| 3,449,956 | A | 6/1969 | Goodkind et al. |
| 3,906,795 | A | 9/1975 | Kask |
| 5,948,035 | A | 9/1999 | Tomita |
| 6,799,462 | B1 | 10/2004 | Berstis |
| 7,240,550 | B2 * | 7/2007 | Raffalt ............... 73/314 |

* cited by examiner

*Primary Examiner*—Hezron Williams
*Assistant Examiner*—Rodney T Frank
(74) *Attorney, Agent, or Firm*—Fay Kaplun & Marcin, LLP

(57) ABSTRACT

Described is a sensor for filling level measurement using a gravitational field analysis, comprising a first and a second gravimeter unit. The measurement is effected in a contactless manner, via the container wall and without input of energy into the filling good. Thus, there is no need for a source emitting measurement rays.

9 Claims, 5 Drawing Sheets

DEVICE AND METHOD FOR DETECTING MATERIAL BY MEANS OF GRAVITATIONAL FIELD ANALYSIS

CROSS-REFERENCE TO RELATED APPLICATIONS

This application is a Divisional application of U.S. patent application Ser. No. 11/075,045 filed on Mar. 7, 2005 now U.S. Pat. No. 7,240,550 which claims the benefit of the filing date of the German Patent Application 10 2004 058 909.7 filed Dec. 7, 2004, the disclosure of both applications are hereby incorporated herein by reference.

FIELD OF THE INVENTION

The present invention relates to the detection of material by means of gravitational field analysis. The present invention especially relates to a gravimeter unit for detecting a gravitational field strength, a sensor for detecting material by means of a gravitational field analysis, a method for filling level measurement of a filling good in a container, the use of a sensor as filling level measurement device, the use of a sensor as proximity switch, a program element for filling level measurement and a computer readable storage medium.

TECHNOLOGICAL BACKGROUND

Each mass containing body generates a gravitational field which effects an attractive force with respect to other masses. In case of a spherical body having a homogeneous mass distribution, the gravitational field emanating from its surface is proportional to the sphere's diameter and its density. Outside the body, the field strength of its gravitational field decreases with the reciprocal value of the square of the distance to the sphere's centre. The gravitational field of the earth, acting as fall acceleration, at the earth's surface has a magnitude of about 9,81 meter per square of a second. A spherical volume of water of 1 m diameter at its surface creates an intrinsic gravitational field obeying a relation of 1 to 70 000 000 as compared to the earth's gravitational field.

This value is extremely small, but may nonetheless be measured by means of a gravimeter instrument. These devices usually consist of a precision mechanical spring mass system, upon which the gravitational field to be measured acts. In this respect, the spring is lenghtened by a weight force of the mass element proportional to gravity, and the change of length thereof, or a necessary compensation force for reaching a defined reference length is taken as a measure for the acting gravitational field strength.

Gravitational pendula, floating bodies and falling body assemblies are also applied for gravitational field measurement.

Besides scientific applications like the measurement of the tidal forces generated by moon and sun, gravimeter instruments are primarily applied for the search and exploration of mineral resources like petrol, gas, coal, ores and salts. In this respect, there is made advantage of the fact that these materials usually have a density different from the normal surrounding stone, and/or modify the density thereof, respectively, when contained in the stones pores.

In the region to be examined, a gravimeter instrument is moved along the earth's surface, and the gravitational measurement values as well as the geographic position thereof are recorded. The gravimeter may also be mounted to an aircraft flying above the region to be examined. Further, it is common to lower gravimeter instruments into bore holes, and to record the measured gravitational field values and the corresponding depth values during the lowering operation.

The result of these series of measurement are maps of the geologic gravitational field abnormalities, and/or depth diagrams showing the field in the subsoil, respectively.

On behalf of the created maps and diagrams, the experienced geologist can now detect density differences present in the subsoil, and can thereby draw conclusions concerning the presence of deposits and the exploitation worthiness thereof.

U.S. Pat. No. 6,612,171 B1 discloses a gravitation measurement apparatus for measuring the gravitational field in bore holes, in order to detect the density of formations in the subsoil. Therein, in order to perform a difference measurement, the disclosed gravitation measurement apparatus may be moved between two positions.

DE 689 15 45 T2 discloses a gravitation gradiometer. Therewith, out of diagonal components of a gravitational gradient tensor are deemed to be measured. In particular, a special bending rotational bearing is disclosed.

WO 98/57197 also discloses a gravitation gradiometer. Therein is described, that the gravitation measurement is often performed out of airplanes, to detect petrol deposits. Accelerations occurring in the aircraft and thereby affecting the gravitation gradiometer are deemed to be compensatable in the gravitation gradiometer described in said pamphlet.

All the known gravitation measurement devices are not adapted for the use as industrially capable sensors for detecting material amount and/or for detecting a filling level of a filling good in a container, respectively. To the one hand, they are much too expensive, too voluminous, and only give the gravitational field in one spatial dimension. The outputted gravitational field display has to be interpreted by a skilled person in order to be able to derive further information therefrom.

Further, response time and energy consumption of the known gravitation measurement devices are much too high for an industrial filling level sensor.

SUMMARY OF THE INVENTION

It is an object of the present invention, to provide for a sensor for direct measurement and output of a filling level value.

According to an embodiment example of the present invention, the above named object may be solved by means of a gravimeter unit for determining a gravitational field strength, the gravimeter unit comprising a first floating body, a first detector and a source for generating a field, wherein the first floating body is contactlessly holdable in a floating state by a field created by the source, wherein a first position of the floating body is detectable by the first detector, wherein the gravimeter unit is adapted to determine first data on the basis of the detected first position or the generated field, and wherein the first data corresponds to a first gravitational field strength at a first location.

Advantageously, there is therefore provided a cost effective, miniaturized and high-resolving gravimeter measuring cell, wherein a mass element detecting a gravitational field by means of electrostatic force fields is contactlessly and three dimensionally held in the floating state. Therefore, the necessity of a mechanical spring element does not apply.

According to this aspect, the present invention is based on the idea, by means of a supporting of a floating body in a floating state, to measure the gravitational force acting thereon. For example, the knowledge of the compensation force necessary to hold the floating body in its original position or to lead it back to its original position, respectively, may be used to draw conclusions concerning the gravitational force acting on the floating body. Therefore, the invention may provide a cost effective, miniaturized and high-resolution gravimeter unit, by means of which gravitational field strengths may be determined three dimensionally without mechanical spring elements or the like.

The floating mass element may be disposed directly above of an integrated semiconductor circuit, so that for example detector and source may at least partly be provided directly thereon.

According to a further embodiment example of the present invention, the field may be selected from the group consisting of electric field, magnetic field, electromagnetic field and mechanical flow field.

Thus, by means of respective components, as for example capacitor plates, fields may be created which hold the floating body in the floating state.

According to a further exemplary embodiment of the present invention, the first detector may be adapted for capacitive, inductive, conductive or optical detection of the first position of the first floating body. The capacitive position detection may for example be effected by means of a second electrode adapted for capacity measurement between the floating body and the second electrode. According to an aspect of the present invention, the floating body may for example be disposed within a cavity filled with a dielectric. This can increase the sensitivity of the capacitive measurement, or may, for example, also stabilize the floating body. Of course, the capacitive position detection may also be effected by means of a pair of electrodes.

In case of the inductive measurement, for example miniaturized coils may be integrated into the gravimeter unit which create a magnetic field effecting the floating body. For example, induction currents may be generated within the floating body.

An optical position determination may have the advantage to couple no additional forces into the floating body besides the radiation pressure of the photons. For example, interferometric methods like they are known from optics may be applied on this behalf.

According to a further embodiment example of the present invention, the gravimeter unit may further comprise a second floating body and a second detector, wherein a second position of the second floating body may be detected by the second detector, and wherein the gravimeter unit is adapted to create the first data on the basis of the measured first position and the measured second position.

Advantageously, in applying two floating bodies within the gravimeter unit, calibrations may be performed and/or ageing processes or temperature change related drifts in the measurement data may be compensated, respectively.

In this respect, it is to be taken into consideration that the gravimeter unit, although it determines the first position of the first floating body and the second position of the second floating body, only one set of data is generated thereof which may provide information about the gravitational field at the location of the gravimeter unit. The implementation of several floating bodies in the gravimeter unit may therefore increase the systems precision and safety, but in the present case may only provide one shared set of data.

According to a further embodiment example of the present invention, the gravimeter unit may further comprise a regulation control means adapted for holding the first floating body in an initial position.

The regulation control means may, for example, send regulation control signals to the source to generate the field, so that the field strength is varied accordingly to counteract a modified gravitational acceleration, and to compensate a deflection of the floating body from the zero position. The control values used for compensating modified gravitational accelerations, may, according to the invention, be additionally incorporated into the determination of the gravitational field strength.

According to a further embodiment example of the present invention, the gravimeter unit may further comprise a storage means for storing reference values.

It may further be possible, in connection with a calibration of the gravimeter unit, to store these reference values in the storage means, and to thereby facilitate or calibrate subsequent measurements. In providing a storage means in the gravimeter unit, a data exchange between the gravimeter unit and external analyzing units or display units may be minimized.

According to a further embodiment example of the present invention, a sensor may be provided for detecting material by means of a gravitational field analysis, wherein the sensor comprises a first gravimeter unit, a second gravimeter unit and a communication interface. The first gravimeter unit may be adapted for determining first data corresponding to a first gravitational field strength at a first position. The second gravimeter unit may be adapted for determining second data corresponding to a second gravitational field strength at a second position, and the communication interface may be adapted for transmitting the first data and the second data to an analyzing unit.

The discrimination between a gravitational field emanating, for example, from a filling good to be detected, and the other gravitational fields stemming from masses that are not to be measured, may be performed in that the gradient values of the gravitational field in the region of the filling good to be measured are determined, and that from their spatial progression the mass distribution in the closer surrounding is determined.

Advantageously, according to this embodiment example of the present invention, the gravitational field strength in the vicinity of the mass to be detected may be measured at different points in space. Since the intervals between the gravitation measurement points and the mass to be detected may be known, from the field gradient values present, the portion of the measured field strength sum corresponding to the examination location for the unknown mass may be determined.

According to this embodiment example of the present invention, an industry sensor may be provided, especially a sensor for determining tank filling positions which allow for contactless measuring of materials, especially filling goods, through closed tank walls. The tank filling level may be detected by the sensor in measuring and analyzing the filling good's intrinsic gravitational field. Advantageously, all requirements posed on a sensor intended for application in industrial facilities may be fulfilled.

To this end, the sensor may be constructed statically in such a way that no gravimeter instrument is mechanically moved along a measurement distance or an area. The created measurement result may not have to be further processed or interpreted by a skilled person, but may represent the directly displayable filling value which may be available continuously, free of interruption and in real time. The measurement result may include no geologic or astronomic components, like varying water content of the subsoil, tectonic mass relocations in the earth's mantle or tidal forces, as they are measured especially by classical gravitational sensors. In the same way, masses moving in the surrounding, like persons and vehicles, may be suppressed in the measurement result.

According to a further embodiment example of the present invention, the determined first data may be based on first floating body position data or on first regulation control parameters of a first regulation control means. Further, the determined second data may be based on second floating body position data or on second regulation control parameters of a second regulation control means.

The floating body position or also the regulation control parameters which may for example be a voltage applied to a capacitor plate, may be data which are easy to measure and precisely to determine, and may allow for substantiated statements concerning respective gravitational forces acting on the floating body.

According to an aspect of the present invention, in the sensor, the first and the second gravimeter units may be disposed at fixed locations with respect to each other. Further, the two gravimeter units, in the factory, may be provided with such a distance that an optimal measurement, for example, for one special container is possible.

According to a further embodiment example of the present invention, the first gravimeter unit may be disposed rotatably about an axis or translatably along an axis, wherein during a rotation or a translation, data based on the detected first positions or the generated fields within the gravimeter unit may be continuously obtained. These obtained data may then be combined into one volume data set representing the topology of a gravitational field. Thereby, by means of this volume data set, conclusions may be drawn concerning a local mass distribution in the surrounding of the sensor. For analyzing the data set and for imaging, known methods, for example from computer tomography, may be applied.

According to an aspect of the present invention, the sensor may comprise a plurality of line-like, area-like or spatially disposed gravimeter units, so that a one dimensional, two dimensional or three dimensional data set representing a gravitational field distribution may be determined.

Further, the sensor may comprise an analyzing unit adapted for receiving the first data and the second data from the communication port, wherein the analyzing unit may be adapted for calculating a gradient of a gravitational field on the basis of the first data and the second data.

According to an aspect of the present invention, the analyzing unit may for example be provided on a semiconductor chip together with the sensor in form of an integrated circuit. It is of course also possible, that the analyzing unit be disposed externally and receives the data from the communication interface via, for example, a radio communication or another wireless data transmission method. The communication interface may of course also be connected to the analyzing unit via a data line.

According to a further embodiment example of the present invention, a sensor according to the invention is used as a filling level measurement device. To this end, the sensor may be disposed in the vicinity of a container, and measure the filling level inside of the container.

Further, according to an aspect the invention, the sensor may be used as vicinity sensor which for example detects whether a door is open or closed, or how far a respective object is distant from the sensor, or by which velocity it approaches the sensor.

According to a further embodiment example of the present invention, a gravimeter is used as filling level measurement device, which for example carries out a method for filling level measurement according to an embodiment example of the present invention.

Further, according to an aspect of the present invention, a gravimeter may be applied as vicinity sensor, for example for detecting distances.

According to a further embodiment example of the present invention, there a gravimeter unit according to the invention may be used as an acceleration measurement means applied for measuring accelerations, for example within a vehicle, an aircraft or another moved or vibrating object, like a person or a machine.

According to a further embodiment example of the present invention, a method for filling level measurement of a filling good in a container by a gravitational field analysis is provided, wherein the method comprises the following steps: determining first data corresponding to a first gravitational field strength at a first location by a first gravimeter unit, determining second data corresponding to a second gravitational field strength at a second location by a second gravimeter unit, calculating a filling level of the filling good on the basis of the determined first and second data.

Advantageously, the application of a gravitational field analysis for filling level measurement may allow for a contactless measurement which may not require any contact with the measurement object. Furthermore, according to an exemplary embodiment of the present invention, there may not be required any radiation source or the like emitting a measurement beam which, for example, is subsequently reflected by the filling good, so that subsequently statements concerning the filling level height can be made. The inventive method may rather applies the measurement of gravitational fields created by the filling good. An insertion of the sensor in the container may not necessary to this end. Also, on account of the measurement, there may no energy transferred into the filling good.

According to a further embodiment example of the present invention, a method for obtaining a volume data set is provided, wherein the first gravimeter unit rotates about an axis or is translated along an axis. Furthermore, a combination of translation and rotation may be performed, so that the gravimeter unit may be moved along an arbitrary one dimensionally, two dimensionally or three dimensionally proceeding path. During the movement, the gravimeter unit may create a first volume data set comprising the first data. For performing this exemplary method, only one gravimeter unit may be necessary, but there may as well be provided several gravimeter units, which may lead, for example, to a faster obtaining of the volume data, or may also allow to save on movement dimensions in the course of the proceeding path.

The present invention further relates to a program element for filling level measurement of a filling good in a container by a gravitational field analysis and a computer readable storage medium, onto which a computer program for filling level measurement of a filling good in a container by a gravitational field analysis is stored. Thereby, the computer program may instruct a processor to carry out a method according to an embodiment example of the present invention, when executed on the processor. The program element according to an embodiment example of the present invention may preferably be loaded into the working memory of a data processor. The data processor may for example be adapted to carry out embodiments of the method of the present invention. Further, the computer program may be written in every programming language, like for example C++, and may be stored on a computer readable storage medium, like for example a CD-ROM. Further, the computer program may be obtainable via a network, like for example the WorldWideWeb, from which it may be loaded into a processor or computer.

Further tasks, embodiments and advantages of the invention result from the dependent claims and the further independent claims.

BRIEF DESCRIPTION OF THE DRAWINGS

In the following, the invention is further described on the basis of embodiment examples with reference to the drawings.

DETAILED DESCRIPTION OF EXEMPLARY EMBODIMENTS

Figure 1:
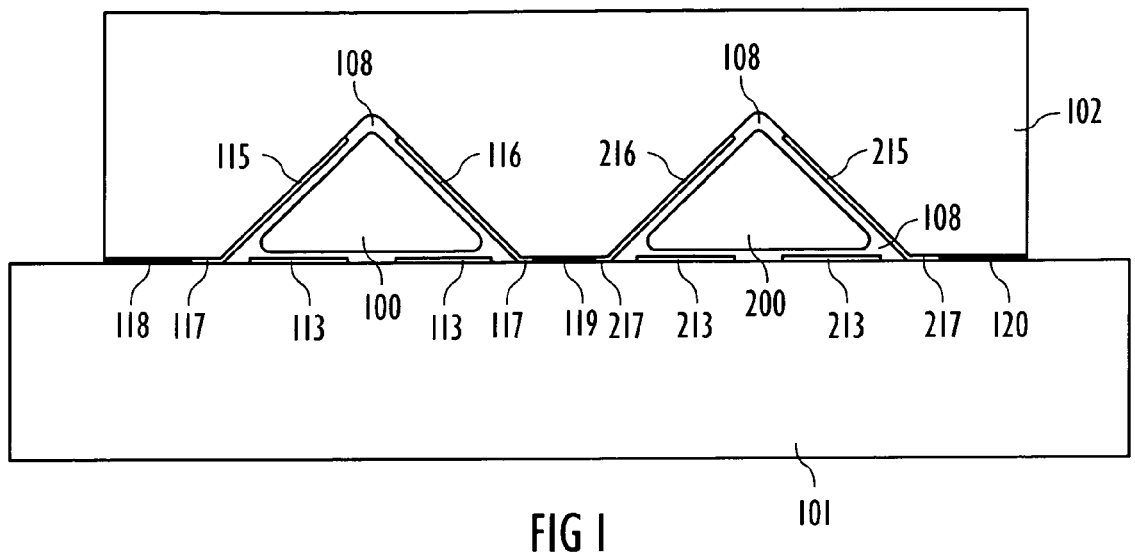
FIG. 1 shows a cross section of an exemplary embodiment of a gravimeter unit according to the present invention.

FIG. 1 shows a cross section of an exemplary embodiment of a gravimeter unit according to the present invention which is explained further below. Several of these gravimeter units may be integrated into a filling level sensor or a filling level limit switch. A corresponding embodiment example is shown in FIG. 6.

Figure 6:
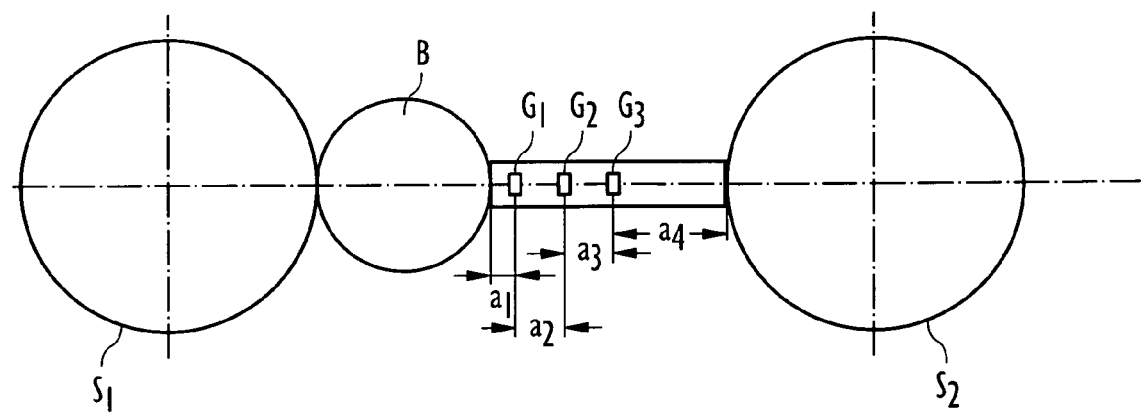
FIG. 6, according to an embodiment example of the present invention, shows a schematic side view of a gravitational filling level limit switch which is horizontally and laterally mounted to a filling good container.

FIG. 6 shows a schematic side view of a gravitational filling level limit switch horizontally and laterally mounted to a filling good container, according to a embodiment example of the present invention.

The filling level sensor according to the invention includes at least two gravimeter units G1, G2 mounted at fixed locations at, or in immediate vicinity to the filling good container to be measured. For compensating varying long-range gravitational fields not caused by filling level changes, for further signal processing, the field strength measurement values of the two or more gravimeter units are subtracted from one another. Thereby, the formation of field difference values is to be carried out in a direction selective manner, which means that field components having the same respective orientation with respect to the spatial x axis, y axis or z axis are to be subtracted from one another.

From the field difference values, and depending on the number of gravimeter units and the locations at the filling good container thereof, the filling level value is obtained according to different, later described methods. For a gravitational field measurement, a miniaturised gravimeter of a new kind is applied. An embodiment example thereof is shown in FIG. 1.

The discrimination between the gravitational field emanating from the filling good to be detected and the remaining gravitational fields emanating from masses that are not to be measured is especially advantageously done in that the gradient values of the gravitational field in the range of the filling good to be measured are determined, and from their spatial progression the mass distribution in the closer surrounding is determined.

Since the gravitational field of each body, outside of itself, decreases with the reciprocal value of the square of the distance to its center of mass, there is a substantially greater percentage of field strength decrease per unit length in its nearer surrounding than this is the case in more distant a distance.

The gravitational fields of differently distant bodies therefore possess an individual spatial gradient change value, and may therefore be discriminated by reference to it.

A small mass situated in the vicinity and having a very weak intrinsic gravitational field, therefore can metrologically be captured due to its great field gradient change value, in spite of the dominantly strong earth field, the gradient change value of which is smaller by many powers of ten though.

To this end, the gravitational field strength in the vicinity of the mass to be detected is measured at different points in space. Since the intervals between the gravitational measurement points and the mass to be detected are known, on the basis of the field gradient values present, the portion of the measured field strength sum corresponding to the observation direction for the unknown mass can be determined.

For many practical applications, it may be sufficient to position the gravitational measurement points on a straight line directing towards the mass to be detected.

In case of a gravitational field sensor of this kind, the individual gravimeter measurement cells, depending on their distance from the target object, detect a differently attenuated object field strength. Thereby, due to the field's gradient change values of the measurement object in the region near to the measurement object, the attenuation is nonlinear to a considerable extent.

On the other hand, depending on the spatial sensor alignment, further distant objects either create repeatedly the same field strengths in the measurement cells, or, due to their low field gradient change values in the far region, an almost linear field decrease along the measurement cells. By means of a suitable mathematical processing of the cell measurement values, the sensor-electronics can determine the far field by means of a calculation.

Gravitational fields, contrary to electromagnetic and acoustic waves, are not subject to the physical effects of absorption, reflexion, dispersion, interference, diffraction and refraction.

If a human hand is transilluminated by means of a light source, the re-exiting light does not allow to see the bone structure. Even if most elaborately developed optical sensors and most complex data processing algorithms are applied, it is not possible to create a bone image in this manner. The reason is that the above mentioned physical effects have destroyed the information content of the light.

Since in transmitting a gravitational field via a layer of material, none of these effects has an impact, the information content of the passing-through field is not modified in any way. This means that the gravitational field of a glass of water positioned behind a thick plate of lead passes through the plate completely unchanged, and it therefore makes no difference, whether it is present or not. The lead plate only adds its intrinsic gravitational field to the ones already present in the space.

As each of the fields has its own origin in space, a discrimination may be possible by way of analysis of the spatial field distribution.

Therefore, it only depends on the accuracy and resolution of the available gravitational sensor technology, whether it is possible to determine via the lead plate, how full the glass is, or even what shape it has.

In the following, at first the measurement according to the invention of filling level limit values, by analysis of the filling good's own gravitational field is described.

Limit level sensors shall report the reaching of a certain filling level. To this end, the sensor is mounted at the outside of the container wall at the height of the level value to be reported. Its duty is to monitor the presence of a filling good's mass in a spatially limited volume. Masses which are positioned at the outside of the container, are not to be looked at.

For example, a filling level limit switch includes three gravimeter circuits, by means of which the gravitational field strength at three different points is measured. The points are preferably positioned on a straight line directed to the level value to be measured. From the three obtained measurement values, by means of difference formation, two adjacent field gradient values can be determined.

While the field strength increases proportional to the filling good diameter, the field gradient at the filling good's surface is independent of the diameter of the filling good's volume. Both, the field strength and the gradient are proportional to the filling good's density. As a function of an increasing distance from the filling good's surface, field strength and field gradient decrease.

The degree of distance-related decrease of both parameters depends on the filling good's diameter and thereby on the container size.

When determining the mounting distance of the three gravimeters inside the filling level sensor, the region of the container diameter to be covered has to be taken into account.

If the distance is chosen too big, the sensor may look via small containers, so that masses behind it are detected. If it is chosen too small, then big containers give only small signal differences between the gravimeters.

Since the gravimeters do not influence each other, a fourth gravimeter having a greater distance may be additionally provided in the sensor.

FIG. 6 schematically shows a gravitational filling level limit switch horizontally mounted to the side of a filling good container.

The gravimeter circuits present in the sensor housing are referred to as G1, G2, G3 the intervals $a_2$, $a_3$ of the gravimeters with respect to each other are for example 20 mm each. The distance $a_1$ between the first gravimeter G1 and the filling good container is for example 10 mm and the distance $a_4$ to the sensor housing back wall is for example 80 mm. The mass of the filling good container m(B) is for example 1 kg, for a diameter of 0.124 m, the masses of the disturbing elements $S_1$ and $S_2$ are for example 100 kg each, at a diameter of 0.58 m each. Of course, completely different distances, densities and masses may be chosen.

The sensor's signal processing detects the presence of a filling good, to the one hand, in that the field gradient between the two gravimeters closest to the filling good have a certain height, which is a sign for a sufficient mass density being present, and, to the other hand, in that the field gradient more distant to the filling good is lower than the first gradient in a certain manner, which is an indication of the detected mass being in the immediate vicinity and correct direction.

For eliminating varying far fields, the sensor's signal processing at first generates the difference values (G1–G2) and (G2–G3) of the field strengths aligned with the straight line of measurement. These values are proportional to the field gradient in the corresponding line interval.

Then, from the height of the first difference value, the signal processing determines two allowed value regions for the second difference value. If the second difference value is positioned in the first value region, the sensor gives out a being-empty notice. If the value is positioned in the second value range, the output of a being-full notice is effected. If the second difference value is not included in either one of the two corresponding value ranges, there is an operational failure, and the sensor gives out a notice of malfunction.

If the sensor is to be provided with a switching hysteresis, this may be done by using different value ranges for the empty/full and full/empty change.

In case of sensors applied as maximum level safety limit switch or minimum level safety limit switch, respectively, it may make sense to assign own value ranges to each of these two modes of operation, in order to prefer the output of a signal based on that sensor output value which is safe for the respective mode of operation.

By means of mathematical functions stored in the sensor, which have the first difference value as input value, the sensor electronics can compute the limits of the assignment ranges of the second difference value with respect to the initial conditions empty/full/malfunction.

Instead of mathematical functions, it is further possible, to store a value table in the sensor, from which the sensor's signal processing may read-out, based on the first difference value, the respective region assignment limits for the second difference value. For limiting the size of the value table, a reasonable number of input values is used, and for intermediate values, interpolation according to known methods is carried out.

On the basis of inputted measurement application properties like container diameter or product density, there exists further the possibility, to additionally adapt the necessary minimal height of the first difference value and the region assignment limits for the second difference value of the actual measurement task.

It is further possible to perform a full matching when the container is filled in order to adapt the signal analysis parameters to the actually occurring field difference values.

In the following, referring to the measurement arrangement represented in FIG. 6, the influence of movable external masses and its distance on the measurement result is indicated.

The filling good container used in the example is very small and, in the filled state, only includes a filling good amount of 1 kg weight. The function of the laterally mounted sensor is to safely indicate the presence of this amount, irrespective of variable surrounding masses.

In order to visualise the influence of moveable mass bodies, in FIG. 6 the disturbing masses $S_1$ and $S_2$ are drawn in. As an example, these are two strongly over-weighted persons, each having a spherical stomach of 100 kg weight. Both persons occupy the position most critical for the measurement arrangement, in that their stomach's center of mass is positioned exactly on the straight line of measurement of the three gravimeters G1, G2, G3. To this end, the first person (disturbing mass $S_1$) is positioned precisely at the backside of the container, the second person's (disturbing mass $S_2$) body contacts directly the sensor housing from the back.

The density of the filling good and the disturbing masses is assumed to be 1 g/ccm (water). All masses have a spherical volume for the sake of an easier calculatability. The container wall has a thickness of 10 mm.

TABLE 1

| filling good mass [kg] | disturbing mass 1 [kg] | disturbing mass 2 [kg] | G1 [nm/s$^2$] | G2 [nm/s$^2$] | G3 [nm/s$^2$] | Diff. value $G_1 - G_2$ [nm/s$^2$] | Diff. value $G_2 - G_3$ [nm/s$^2$] | Diff. value $(G_1 - G_2) - (G_2 - G_3)$ [nm/s$^2$] | display |
|---|---|---|---|---|---|---|---|---|---|
| — | 100 | — | 37.1 | 33.8 | 31.0 | 3.3 | 2.8 | 0.5 | Empty |
| — | — | 100 | −39.7 | −43.9 | −48.7 | 4.2 | 4.8 | −0.6 | Empty |
| — | 100 | 100 | −2.6 | −10.1 | −17.7 | 7.5 | 7.6 | −0.1 | Empty |
| 1 | — | — | 12.9 | 7.9 | 5.3 | 5.0 | 2.6 | 2.4 | Full |
| 1 | 100 | — | 50.0 | 41.7 | 36.3 | 8.3 | 5.4 | 2.9 | Full |
| 1 | — | 100 | −26.8 | −36.0 | −43.4 | 9.2 | 7.4 | 1.8 | Full |
| 1 | 100 | 100 | 10.3 | −2.2 | −12.4 | 12.5 | 10.2 | 2.3 | Full |

Based on 7 different mass combinations, table 1 shows the field strength values occurring at the three gravimeters, as well as the difference values calculated therefrom. The field strengths are given in nanometers per square second, and are valid in the direction of the straight line of measurement.

The first 3 rows of the table show the field values, when the container is empty, and disturbing masses are present. The fourth row shows the field values, when the container is full, and without the disturbing masses. The last 3 rows show the field values, when the container is full and the disturbing masses are present.

It can be seen that in case of disturbing masses without filling good, although the first field difference value definitely indicates a mass being present, the difference with respect to the second difference value is marginal though.

This means that the detected mass is positioned outside the spatial volume to be monitored, and therefore must not be indicated.

In case of the disturbing masses and filling good, it can be seen that the first difference value is high and that the difference with respect to the second difference value is also big enough for the intended being-full notice.

Although in the example the disturbing masses both have been 100 times as big as the filling food mass, the gravitational field sensor was able to indicate the filling level correctly.

The values of table 1 further show that in using only 2 instead of 3 gravimeters, a discrimination between the filling good and the listed disturbing masses would not be possible.

In case of especially critical applications like filling goods of low density or measurements via thick container isolation layers, for suppression of disturbing masses, the employment of 4 gravimeter circuits inside the sensor may become necessary.

Since the described measurement method selectively analyses the gravitational fields in the direction of the straight line of measurement, disturbing masses, the center of mass of which is not spatially positioned at the straight line of measurement, contribute to the measurement only to a reduced content or not at all.

Secondly, in the following, the inventive measuring of continuous filling levels by means of analysis of the filling good's intrinsic gravitational field is described.

The measuring of continuous filling level values may occur by means of four different methods of the field analysis. In a sensor, these methods may be applied individually or also in combination.

Figure 7:
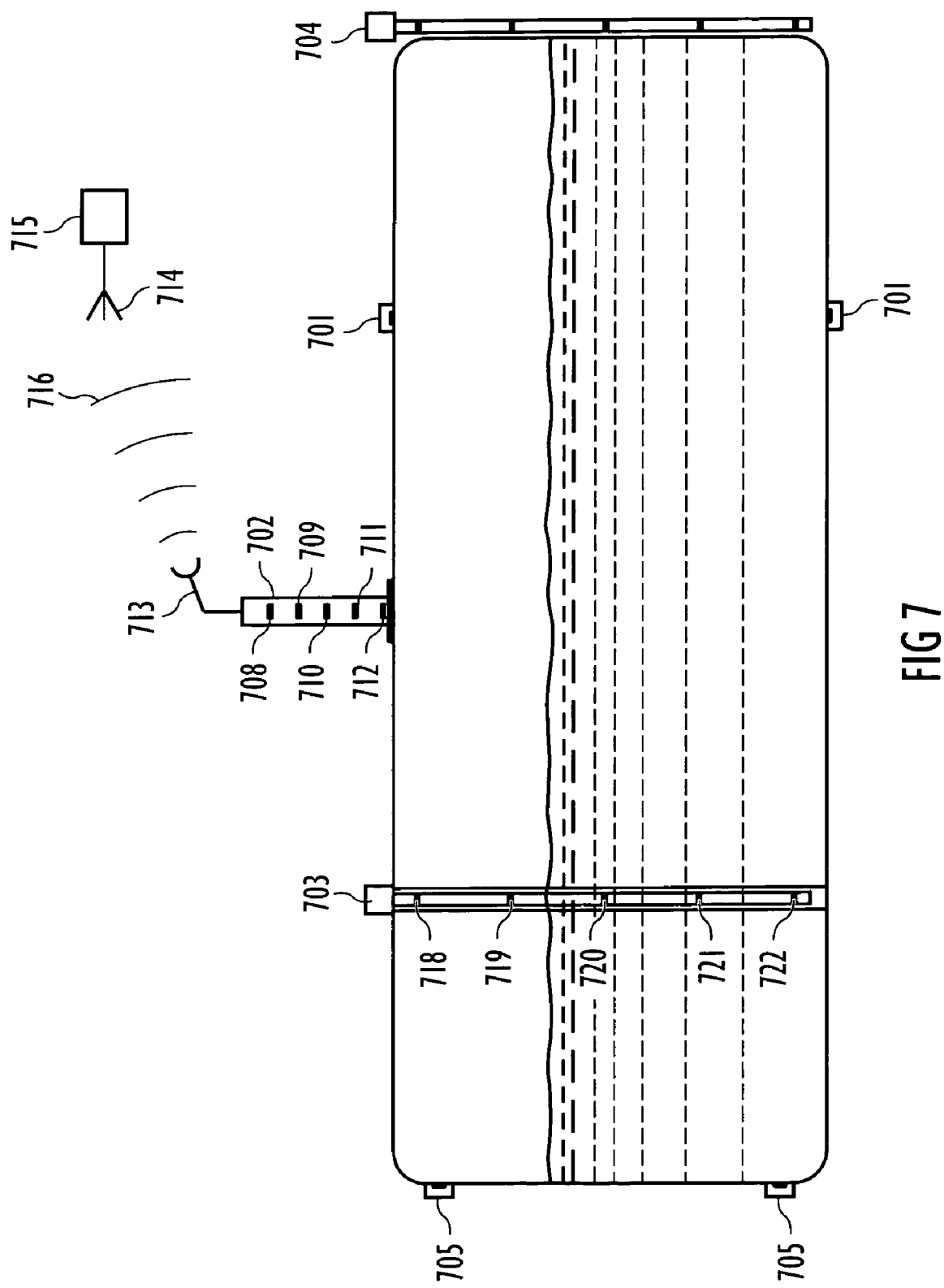
FIG. 7 shows a schematic cross sectional view of a partially filled filling good container at which five different types of continuously measuring sensors according to embodiment examples of the present invention are mounted.

FIG. 7 shows a schematic cross sectional view of a partly filled filling good container, at which five different types of continuously measuring sensors according to embodiment examples of the present invention are mounted.

The first method is based on the analysis of the field strength difference for a filling good being positioned between the gravimeters.

To this end, preferably a first gravimeter is mounted to the lower side of the filling good container, and a second one to the upper side. This kind of sensor is referred to by the numeral 701 in FIG. 7.

If the container is empty, a measurement value difference between both gravimeters exist, corresponding to the earth field's gradient multiplied by the container height. By means of zero point compensation, this value is eliminated from the measurement result.

When the container is being filled, the filling good's gravitational field at the location of the lower gravimeter is opposed to the earth field, so that field strength measured by the lower gravimeter is falling. At the location of the upper gravimeter, the filling good's field adds to the earth field, so that its field strength increases.

The measured field strength difference between both gravimeters, after suitable measurement value linearising gives a filling level display proportional to the container filling good mass.

It is also possible to mount the two gravimeters at two side walls of the filling good container opposite to each other. With respect to the precise detection of the empty state and the filled state, the above indicated manner of mounting is to be preferred. The measurement result is dependent on the filling good density.

The second method is based on the analysis of the field strength's decrease on account of an increasing distance to the filling good.

According to the gravitational field law, the gravitational field outside the filling good decreases with the reciprocal value of the square of the distance to its center of mass. The degree of change of field strength due to distance is both, a measure for the filling good diameter as well as for the distance to the filling good. A sensor working according to this principle includes several gravimeter circuits mounted in one line. The line of mounting preferably is directed towards the filling good's center of mass. This type of sensor is referred to by numeral 702 in FIG. 7.

Sensor 702 comprises for example five gravimeter units 708, 709, 710, 711 and 712 disposed vertically on top of each other. The sensor may be mounted either above or below the container. Further, the sensor comprises a communication interface 713 which for example comprises a sending device. Via the communication interface 713 sets of data which, for example, are based on measurement data of the gravimeter units 708, 709, 710, 711 and 712, by means of radio transmission 716 may be sent to an external analysing unit 715 having a receiver 714. It is of course also possible, to integrate the analysing unit 715 into the sensor, and then to transfer a result of analysis (for example filling level height) via interface 713 to an output unit or to a device for further processing.

By means of the measured field values and the known physical gravitational field distribution laws outside of mass bodies, the sensor's signal processing computes the distance to the filling good or its height, respectively.

If only 2 gravimeters are used in total, there are available only 2 field measurement values having a different distance from the filling good's center of mass, from the difference of which there may be calculated only one field gradient. As a consequence, the filling level measurement value which may be derived therefrom depends on the filling good density.

Therefore, there are preferably applied at least 3 gravimeters, from the field measurement values of which there may be calculated at least 2 field gradients at different locations. From these at least 2 field gradient values, there may be obtained the filling level independent of density. The 3 parameters filling height, filling good density and far field amplitude, which are not known in this case, for solving the measurement problem require at least 3 gravimeters giving 3 field measurement values at different spatial locations.

During the first placing into operation of the sensor, there has to be effected a zero point compensation with the filling good container being empty, in order to remove static near field components like the container's empty mass from the measurement result.

The third method is based on the analysis of the field strength's distribution within the filling good or along its limiting surfaces. According to the gravitational field law, the field created by a spherical filling good increases linearly from the center of mass to the filling good's surface, wherein the field strength within the filling good is proportional to the distance from the center of mass. If the filling good is not spherical, the circumstances are more complicated, but are nonetheless strictly according to physical law(s).

Generally, in the center of mass of the filling good, the intrinsic field strength thereof is generally zero. The sensor 703 includes several gravimeters 718, 719, 720, 721, 722 mounted on a line, which are contained in a shared protecting tube. The sensor is mounted in such a way that it preferably dips into the filling good, but it may also be disposed vertically at the container's side wall. If the mounting line of the gravimeters, if the sensor 703 is dipped in, proceeds through the center of mass of the filling good, this is especially advantageous, but not at all a requirement.

Based on the field strength's difference values between the individual gravimeters and the known physical field distribution laws within mass bodies, the sensor's signal processing calculates the filling level value. In carrying out a zero point compensation, static near field components are compensated. If only 2 gravimeters are used, the filling level measurement result depends on the filling good density. If at least 3 field measurement values at different spatial locations are available, the filling level may be detected independent of density.

The gravimeters that are presently not dipped-in, according to the filling level, may be used to additionally determine the filling level according to method two. It is further advantageous to take into consideration the value of the lastly dipped-in gravimeters together with the one of the first no-longer-dipped-in gravimeter in a common calculation according to method one. In combining the result values of all used methods, the measurement accuracy of the sensor may be increased.

The advantage of this type of sensor, as compared with dipping-in filling level rod-probes of other physical measurement principles is that the sensor may measure through a separating tube built into the container and protecting it from the filling good. In this way, there may therefore be realised insertable sensors for transport containers In the container, a separation tube closed at one end and open to the outside is built-in. During the filling and for the purpose of other inspection tasks, the gravitational sensor is temporarily shifted in and measures the filling level via the separating tube. Thereby, the container remains hermetically sealed. In the example of FIG. 7, such a separating tube is additionally drawn in.

The forth method is based on the analysis of the spatial location of the gravitational field vector. Such a sensor is referred to by the numeral 704 in FIG. 7.

If a sensor 704, due to its mounting, does not have the individual gravimeter positions on the straight line of inclination of the filling good's center of mass, the gravitational field vector acting upon the gravimeters due to filling level changes not only changes its length, but also its spatial orientation.

The three dimensional gravitational field vector is created by the orthogonal field components in the x direction, y direction and z direction. The z field is directed into the filling height direction and is perpendicular to the ground. On the other hand, the x field and y field proceed parallel to the ground. Thereby, the x field shall represent the gravitational component in the direction to the container's middle, and the y field shall represent the component parallel to the container wall and/or tangential to the container wall, respectively, at the mounting position of the sensor.

If the sensor 704 is mounted centrally to the side wall of a symmetrical container, during filling, the gravimeters sense a field in x direction and z direction. A y field component does not occur, since due to the central mounting of the sensor the individual y fields compensate each other at the sensors position. If mounting is not central, the filling good creates all 3 field components at the gravimeter positions. The amplitude relations of the orthogonal field components at the gravimeters and/or the angular orientation of the resulting gravitational field vectors in space, respectively, is characteristic for each individual filling level value, and thereby the filling height may be derived therefrom. Since the amplitude relations are analysed, the absolute amplitude values do not enter into the measurement value, so that it is independent of filling good density.

Each gravimeter of sensor 704 detects the components of the gravitational field in the three spatial coordinates. The field strength values won in this way are cleared from fluctuating far fields in that differences between the gravimeters are formed. When placing into operation the sensor, a zero point compensation/correction serves to eliminate the static gravitational field of the ambiance. From the differential field strength values and the known positions of the gravimeters, the sensor's signal processing calculates the position of the filling good and thereby the filling level value. This forth method as well may be combined with the other three methods depending on the construction of the sensor 704.

The sensor referred to by the numeral 705 in FIG. 7, consisting of two gravimeter units and mounted at the container's side wall, applies for example the methods one and four.

Besides calculating the filling height from the gravimeter measurement values by applying the known physical field distribution laws, taking into consideration the mounting positions of the gravimeters and possibly additionally entered container data, there exists also the possibility to determine the filling height from the current gravimeter measurement values by means of a comparison with previously stored gravimeter measurement values during an initial filling.

To this end, subsequent to mounting the sensor, the container to be measured, is filled in steps, and subsequent to each filling step, the existent filling height is communicated to the sensor. The latter stores, in addition to the input filling level value, the occurring gravitational measurement values of all gravimeters. During measurement operation later on, the sensor's signal processing now compares the currently measured gravitational values with the stored given values and interpolates the filling level between the two closest stored values.

In the methods 2 to 4, preferably not the absolute values of the field difference measurement values are compared to one another, but the ratio values of the individual field differences with respect to each other. In this manner, also filling goods having a medium density different from that of the filling during placing into operation may be accurately measured.

In applying several ones of the methods 1 to 4 in one sensor, the filling level may be determined according to several different methods. Creating the average value of the individual measurement results leads to an increased measurement accuracy of the sensor.

If a disturbing mass occurs, depending on the position of the mass, the individual methods react to it with different sensitivity. Therefore, the generating of averages of several methods additionally increases the insensitivity with respect to disturbing masses.

After carrying out a plausibility test on the individual measurement results, it is therefore also possible to exclude a result which has been noticed to be imprecise from determining the average of results.

In using more gravimeters and therefore field strength measurement points in a sensor than would be theoretically necessary, an over-determining of the filling level is also possible. Further, additional gravimeters make it possible to reduce the distance of field measurement points, so that the near field measurement range of the sensor is reduced, and possible disturbing masses are more likely effective as unproblematic far fields.

The choice of a beneficial mounting position of the sensor at the filling good container additionally increases the security against disturbance.

Besides these passive methods for suppressing the influence of disturbing masses on the measurement result, there also exists the possibility to determine the disturbing mass directly, and later on compensate the result for it by calculation. A requirement for proceeding this way is a sufficiently large number of field measurement values, and thereby input values, for the correction algorithm.

The number of required gravimeters in a continuous filling level sensor also depends on the shape of the container. Slim and irregularly shaped containers may require more gravitational measurement points and thereby more gravimeters than flat, simple containers.

At the sensor referred to by numeral 704 in FIG. 7, the gravimeters are surrounded by a shared metal tube. Therefore, the sensor is only adapted for being mounted to straight container walls. If the gravimeters are integrated into a flexible band, the sensor may also follow curved container walls. Besides these pre-configured sensors, individual gravimeter units may be disposed at the container wall in regular intervals, and via a two lead data bus cable may be connected to the analysing electronics of the sensor. The individual gravimeters are preferably by means of cable penetration technology connected to a rubber like ribbon cable having a rectangular cross section. The continuous bus cable therefore has neither to be dissected nor unisolated.

In case of sensors consisting of few gravimeter units, like the type 701 and the type 705 in FIG. 7, an existing field bus may be used for exchanging data as well. All units are connected to each other via the field bus. The slave-units give their measured gravitational values directly on the bus, the master-unit reads them from the bus again, combines them in a calculation with the own gravitational measurement values to the filling level value, and outputs this on the bus.

Based on the later described miniaturised gravimeter circuit and modem radio transmission techniques, the development and application of wirelessly sending gravimeter units is possible as well.

These devices consist for example of the gravimeter circuit, a highly integrated radio interface and a long-living lithium battery as current supply. The volume of this unit has the size of a matchbox or even smaller. The required number of gravimeter units are glued to the respective places at the container. A distantly mounted analysing unit receives the measurement data of all gravimeters and combines them in a calculation with the filling level value. Thereby, one analysing unit is sufficient to receive the data of a plurality of containers, and to calculate their filling levels.

A still further miniaturisation is possible by means of technologies, as they are applied with intelligent credit cards and product labels. In this way, the gravimeter units may be designed as flat, flexible adhesive labels. In its inside, there is the gravimeter chip, the sender chip, a planar antenna, a lithium polymer battery and maybe an amorphous solar cell for charging the battery. The area is for example 1 cm by 4 cm, the thickness about 1 mm. By means of these sensoric adhesive labels, container and tubings may then be provided with instruments in a revolutionarily easy manner. A central receiver unit then calculates all the filling level values and outputs them to the process control.

If by means of special gravimeters it is possible, within one gravimeter unit, to measure several gravitational field strengths at different positions or to directly determine their difference value, respectively, the above described gravitational field measuring point arrangements and the corresponding gravitational field analysis methods may be respectively transferred, in the same sense, to such gravimeter units, without deviating from the scope of the invention in doing so.

The filling level measurement on the basis of gravitational fields present the following features and advantages of application:

All liquids and liquefied gases may be measured. Pourable goods must possess a minimal density, granulation is of no importance. The measurement may be effected via the closed container wall, all wall materials are suitable. This is especially advantageous in case of corrosive, abrasive, explosive, sterile, poisonous, biologically dangerous, radioactive and ultra clean filling goods, as well as in case of high pressure tanks. Very hot and very cold filling goods are measured across the tanks isolation. Since the measurement method is sensible to mass amounts, adhering products, dirt depositions and foam are ignored. It is therefore also suited for especially glooey and stringy/ductile filling goods. Filling goods which show a tendancy for very high electrostatic chargings, can neither destroy the sensors mounted at the outer wall nor contaminate them with product.

The application in explosion secured areas is possible without problems. There is no energy coupled into the filling good. The sensor's current supply and measurement transmission are possible by means of an inherently safe 4 . . . 20 mA current loop.

Parts disposed within the container, like agitation blades, deflector plates, splash walls, heating coils and/or cooling coils, heat exchanger registers, perforated intermediate floors, gas injection lances, catalyser support plates as well as filling body pourings are penetrated by the gravitational field without change, so that filling good positioned behind them or below them may be measured without problem.

Besides the mounting at the outer wall, gravimeter sensors may also be threaded into the container wall, or be flanged thereto. In this case, certain sensor embodiments end up with the wall in a flush manner, so that there will not result any narrowing of the exit cross section of containers or of the flowing-through cross section of ducts. Small screw-in threads of the size M8 are possible.

Sensors mounted at the outside of the container may be replaced or retrofitted without interrupting the operation of the facility.

The construction of a new miniaturised gravimeter according to the invention is now described, as it is shown as exemplary embodiments in the FIGS. 1 to 5, and which is adapted for the application in industrial facility sensors in an especially advantageous manner.

The technique of the classical precision mechanical gravimeters, as they are used in the field of the geology, are not only much to expensive for applications in the industrial measurement technology and show a too slow response time, especially bothersome is the much too big construction volume as well. Thereby, not only the realisation of a compact sensor is prevented, but the required punctual determination of the gravitational field in small intervals is not allowed for.

A further disadvantage of the classical gravimeter is the fact that they are able to measure the gravitational field in one spatial dimension only. Therefore, in order to obtain a three dimensional detection of field, 3 of these devices are necessary. Besides the immense costs, such a configuration would also not allow for the measurement of the 3 field components at the same point in space.

A substantial step in the correct direction is represented by integrated micro-mechanical acceleration sensors. In case of these sensor elements, by means of etching processes, out of a silicon substrate there is created a bending beam structure having shaped thereon a mass element. By means of capacitive distance measuring, the deflection of the bending beam is detected and by means of an electrostatic compensation force field, the bending beams zero position is restored. From the required compensation field strength, the measurement result is obtained.

The disadvantage of these sensor elements is that the precision and dissolution necessary for the gravitational field measurements is not sufficient.

The elastic constant of the bending beam structure cannot be arbitrarily reduced, because otherwise plastic deformation would result which lead to a loss of the zero point stability. In addition, complex micro-mechanical structures are generally subject to a plurality of error influences. It is further disadvantageous that mechanics and electronics have to be created at the same substrate material, so that both components might not be produced in an optimal manner. In case of a three dimensional field measurement, in this case as well there would be necessary three measurement elements disposed orthogonal to each other.

The realisation of a cost effective, miniaturised and high-resolving gravimeter measurement cell according to the invention is effected in that the mass element detecting the gravitational field by means of electrostatic force fields is held contactless and three dimensionally in the floating state. The necessity of a mechanical spring element thereby does not apply.

The position of the mass element is capacitively determined. The floating mass element is preferably disposed directly above an integrated semiconductor circuit, so that at least a portion of the required field creating and measuring electrodes may be directly disposed thereon. Out of the electrical field strength necessary for maintaining a defined floating state position of the mass element, there may be calculated the values of the gravitational field strength in the spatial dimensions.

Figure 2:
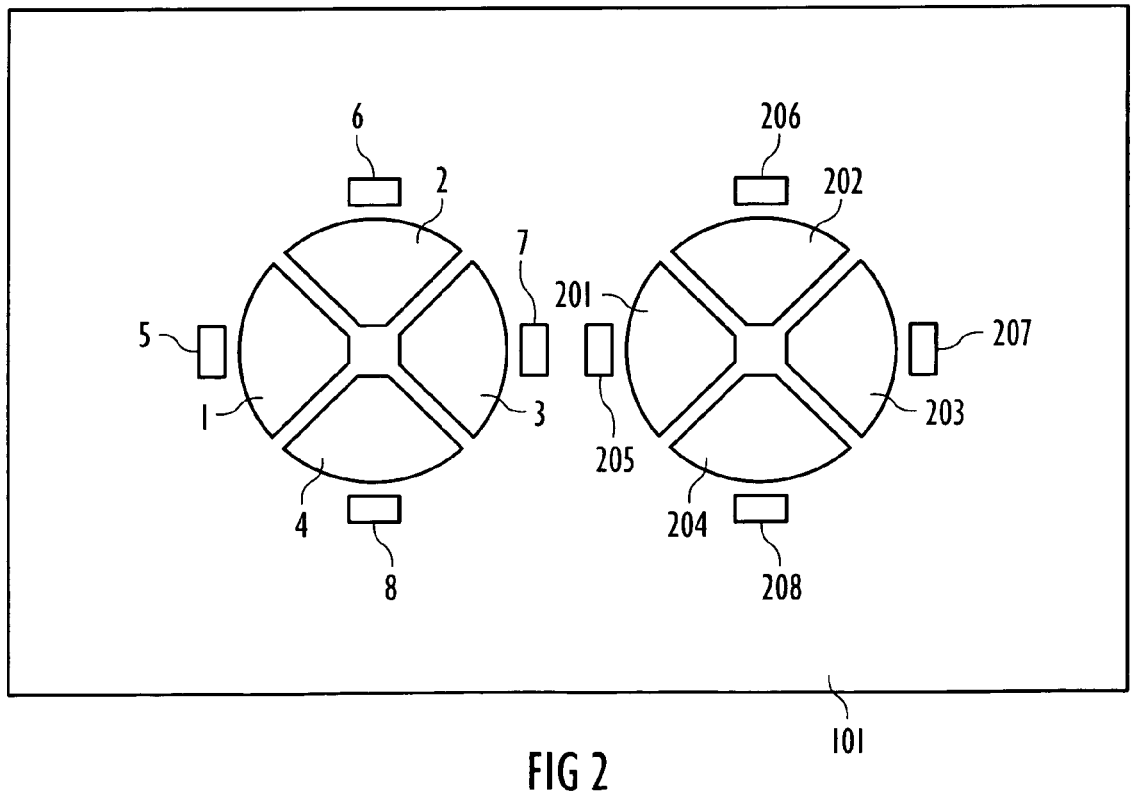
FIG. 2 shows a plan view onto a semiconductor chip having electrodes disposed thereon of the embodiment of the inventive gravimeter unit shown in FIG. 1.

The FIGS. 1 and 2 show a first embodiment example of such a floating body gravimeter cell.

FIG. 1 shows a cross section of an exemplary embodiment of a gravimeter unit according to the present invention.

FIG. 2 shows a plan view of a semiconductor chip having electrodes applied thereon of the embodiment shown in FIG. 1 of the gravimeter unit according to the invention.

At a semiconductor chip 101, which contains the signal processing electronics, a formed part 102 is mounted having two conical recesses. The formed part 102 consists of non-conducting isolating material as for example glass or ceramics. In the two cavities resulting from the recesses, there is a conical metal body 100, 200, respectively. Its diameter is for example 0,5 mm. In order to be able to apply electrostatic forces onto it in all three spatial dimensions, inside the cavities, there are disposed eight electrodes having the shape of a segment of a quarter of a circle each. One half thereof is situated on the semiconductor chip 101 and forms the base electrodes 113, 213, 1, 2, 3, 4, 201, 202, 203, 204, the other half is metalised onto the inner side of the conical recess of the formed part 102, and forms the lateral electrodes 115, 116, 215, 216. At a formed part's lower side, by means of the contact areas 117, 217, the lateral electrodes are electrically contacted to the chip 101. Reference numerals 118, 119, 120 refer to filling material.

FIG. 2 shows the chips surface with the base electrodes and the contact areas 5, 6, 7, 8, 205, 206, 207, 208 to the lateral electrodes.

The slit 108 between floating body 100, 200 and chip 101 and/or formed part 102, respectively, shown in FIG. 1, acts as dielectric for the electric field. The dielectric 108 consists either of vacuum, an inert gas like for example nitrogen or a non-conducting liquid having preferably a high dielectric constant. Besides increasing the values of the capacities and electric field forces by the dielectric constant, the use of a liquid further presents the advantage of a good damping of mechanical vibrations by viscosity-caused liquid-related friction. The slit width is small, and is for example 0.005 mm.

By application of a voltage between the base electrodes 113, 213, 1, 2, 3, 4, 201, 202, 203, 204, the floating body is electrostatically drawn downwards. A voltage between the lateral electrodes 115, 116, 215, 216, draws it upwards. If, at one side, a voltage is applied between one base electrode and one side electrode, the floating body is drawn to the respective side. By means of suitable driving of electrodes, there may also be created rotational tilting moments.

For coupling in the electrostatic forces, there may be used both, constant voltages and alternating voltages.

The capacitive distance measurement for detecting the precise position of the floating body, is preferably carried out by means of the same electrodes that serve for the force in-coupling. In this respect, it has to be taken into consideration that the high frequency measurement field creates attraction forces as well.

The measurement electronics and regulation control electronics on the semiconductor chip now makes the floating body be held in an exactly symmetrical position with respect to the electrodes. The gravitational force acting on the floating body from outside by means of the gravitational field is compensated by an oppositely directed electrostatic compensation force. The necessary compensation force in the three spatial dimensions thereby is a measure for the gravitational field in the three spatial dimensions.

The applied regulation control voltages of the individual electrode segments are preferably chosen in such a way that there results a middle mass potential at the floating body. To this end, one half of the electrodes is driven by a positive voltage level with respect to middle mass, and the other half is driven with the respective negative level with respect to the middle mass.

Since the floating body integrates the applied electrostatic forces with respect to time, besides analog drive voltages, there may be applied digital pulse width modulated binary level voltages or ternary level voltages as well.

In the following, the physical calculation formulas for an idealised floating cone gravimeter are listed. Further, with reference to the calculation example is shown the height of the electrode drive voltages occurring in practice for gravitational field compensation, as well as the resulting electrode capacity values.

Lifting force and effective weight force of the floating body:

$$m = \rho_1 \cdot V$$

$$V = \frac{\pi}{12} \cdot d^2 \cdot h$$

$$m = \rho_1 \cdot \frac{\pi}{12} \cdot d^2 \cdot h$$

$$F_A = \rho_2 \cdot V \cdot g = \rho_2 \cdot \frac{\pi}{12} \cdot d^2 \cdot h \cdot g$$

$$F_G = (\rho_1 - \rho_2) \cdot V \cdot g = (\rho_1 - \rho_2) \cdot \frac{\pi}{12} \cdot d^2 \cdot h \cdot g$$

m=cone mass
d=cone diameter
h=cone height
V=cone volume
$\rho_1$=cone density
$\rho_2$=dielectric density
g=gravitational field strength
$F_A$=lift force
$F_G$=effective weight force Electrostatic forces $F_{EL}$ of the individual electrodes $$F_{EL} = \frac{\varepsilon_o \cdot \varepsilon_r \cdot A \cdot U^2}{2s^2}$$

$\epsilon_0$=electrical field constant=$8.85 \cdot 10^{-12}$ F/m
$\epsilon_r$=dielectric constant of the dielectric
A=effective electrode area with respect to a spatial dimension x, y or z.
U=voltage between electrode and floating body
s=dielectric slit width $$A_x = A_y = \frac{h \cdot l}{2}$$

$$l = d \cdot \sin\frac{360°}{2n}$$

$$\left. \begin{array}{l} A_x = A_y = \frac{h}{2} \cdot d \cdot \sin\frac{180°}{n} \\ A_z = \frac{\pi}{4} \cdot d^2 \cdot \frac{1}{n} \end{array} \right\}$$ Isolation areas between the electrodes are not taken into account.

n=number of basis electrodes or lateral electrodes
l=chord length of the lateral electrodes
x,y=spatial dimension parallel to the base electrodes
z=spatial dimension perpendicular to the base electrodes $$\left. \begin{array}{l} F_{EL(x)} = F_{EL(y)} = \frac{\varepsilon_o \cdot \varepsilon_r \cdot h \cdot d \cdot U^2}{4s^2} \cdot \sin\frac{180°}{n} \\ F_{EL(Z)} = \frac{\varepsilon_o \cdot \varepsilon_r \cdot \pi \cdot d^2 \cdot U^2}{8n \cdot s^2} \end{array} \right\}$$ values for 1 electrode segment Electrode drive voltage for compensating the weight force or gravitational force, respectively:

$$F_{EL} = F_G$$

$$\frac{\varepsilon_o \cdot \varepsilon_r \cdot h \cdot d \cdot U_x^2}{4s^2} \cdot \sin\frac{180°}{n} = (\rho_1 - \rho_2) \cdot \frac{\pi}{12} \cdot d^2 \cdot h \cdot g_x$$

$$\left. U_x = s \cdot \sqrt{\frac{g_x \cdot (\rho_1 - \rho_2) \cdot \pi \cdot d}{3 \cdot \varepsilon_o \cdot \varepsilon_r \cdot \sin\frac{180°}{n}}} \right\}$$ is valid accordingly for $U_y$ with $g_y$ $U_x$=drive voltage of a lateral electrode for compensating a gravitational field in x-direction.

$$\frac{\varepsilon_o \cdot \varepsilon_r \cdot \pi \cdot d^2 \cdot U_z^2}{8s^2} = (\rho_1 - \rho_2) \cdot \frac{\pi}{12} \cdot d^2 \cdot h \cdot g_z$$

$$U_z = s \cdot \sqrt{\frac{2 \cdot g_z \cdot (\rho_1 - \rho_2) \cdot h}{3 \cdot \varepsilon_o \cdot \varepsilon_r}}$$

$U_z$=drive voltage of all base electrodes or all lateral electrodes for compensating a gravitational field in z-direction.

Capacities between electrodes and floating body:
$C_B$=capacity of a base electrode
$C_S$=capacity a lateral electrode
$A_S$,$A_B$=areas of the electrodes $$C = \frac{\varepsilon_o \cdot \varepsilon_r \cdot A}{s}$$

$$A_B = \frac{\pi \cdot d^2}{4 \cdot n}$$

$$A_S = \frac{\pi \cdot d}{2 \cdot n} \cdot \sqrt{\frac{d^2}{4} + h^2}$$

$$C_B = \frac{\varepsilon_o \cdot \varepsilon_r \cdot \pi \cdot d^2}{4 \cdot n \cdot s}$$

$$C_s = \frac{\varepsilon_o \cdot \varepsilon_r \cdot \pi \cdot d}{2 \cdot n \cdot s} \sqrt{\frac{d^2}{4} + h^2}$$

Computation of gravitational field:

$$g = \gamma \cdot \frac{m}{r^2}$$

$$m = \rho \cdot V$$

$$V = \frac{4}{3} \cdot \pi \cdot r^3$$

-continued $$g = \gamma \cdot \rho \cdot \frac{4}{3} \cdot \pi \cdot r$$

g=gravitational field at the surface of a spherical object
γ=gravitational constant=$6.67 \cdot 10^{-11}$ m$^3$/kg·s$^2$
m=mass r=sphere radius V=volume ρ=sphere density

APPLICATION EXAMPLE

The gravimeter is mounted laterally to a spherical tank. The cone tip shows downwards. The filling good field acts in x-direction. The earth field acts in z-direction. The filling good is water.

Given values:

| | |
|---|---|
| filling good density | ρ = 1000 kg/m$^3$ |
| tank radius | r = 0.5 m |
| cone diameter | d = 500 μm |
| cone height | h = 250 μm |
| cone density | $\rho_1$ = 2700 kg/m$^3$ |
| dielectric density | $\rho_2$ = 700 kg/m$^3$ |
| slit width | s = 5 μm |
| number of electrodes | n = 4 |
| dielectric constant | $\epsilon_r$ = 20 |
| earth field | $g_E$ = 9.81 m/s$^2$ |

Calculated values:

| | |
|---|---|
| base electrode capacity | $C_B$ = 1.74 pF |
| lateral electrode capacity | $C_S$ = 2.46 pF |
| filling good gravitational field | $g_F$ = $1.4 \cdot 10^{-7}$ m/s$^2$ |
| drive voltage for the base electrodes | $U_Z$ = 680 mV |
| drive voltage for the lateral electrode turned away from the filling good | $U_X$ = 171 μV |

As the calculation example shows, for creating the electrostatic compensation forces, voltages of low value are sufficient, so that an operation of the measurement cell electronics is possible without problem by means of a usual 5 volt supply voltage.

Since the floating body gravimeter, due to its operation principle, does not contain any mechanical spring component, not only the error components which such a structure implicates are omitted, but the restriction of spring stiffness with respect to the measurement value resolution doesn't apply any more.

Advantageously, the components of the gravimeter cell are not subject to any deformation during the measurement operation, but are only operated statically. Therefore, changes of component dimensions by creeping events or parameter modifying material re-crystallisation processes on account of pull-tensions or push-tensions do not apply.

Due to the fact that on the semiconductor chip there don't need to be created any mechanical structures, the process of its production may be completely designed for optimising the electronic circuit components.

If a liquid is used as dielectric, the thermal expansion thereof has to be taken into consideration. Inside the formed part, there may for example be provided a partly gas filled capillary tube into which the dielectric liquid may expand. Due to the surface tension of the liquid, as is the case in a liquid thermometer, a drift of the gas column out of the capillary is prevented.

In case of a gaseous dielectric, the floating body cavity is preferably to be provided hermetically sealed so that in case of a change of temperature the occupied volume of the gas, and thereby its density as well, remains constant.

Since, with respect to the measurement accuracy, highest expectations are posed on the gravimeter measurement cell, several error compensation mechanisms are applied. Especially temperature dependent and ageing dependent value alterations of mechanical and electrical kind are to be compensated.

In order to create two measurement values which are mathematically dependent on the gravitational field and the error component in different way(s), on the chip there may be provided two floating body units which are identical in all dimensions. Further, the corresponding drive circuit parts and analysis circuit parts may be constructed identically.

A difference between both arrangements is that the floating body 100, 200 (see FIG. 5) consists of two different metals having a different density. Thereby, it is achieved that the gravitational field enters into the measurement results of the two floating body units with two different factors. Since both factors are known, an error compensation can be obtained in that both measurement values are combined in a calculation.

If a liquid dielectric is used, the error in lifting caused by its expansion may be compensated in this manner.

A comparison of the capacity values of the eight electrode segments within a floating body unit gives additional correction values.

While a change in position of the floating body results in an increase in capacity for a part of the electrodes, and in a decrease for another part, thermal material expansions result in changes of equal kind. By means of a suitable combination of the electrode segment values in a calculation, these errors may be compensated. By means of a further cavity arrangement which does not contain a floating body, it is further possible to separately measure the basic capacity values.

By means of creating test forces, further information concerning the operational parameters of the measurement cell may be obtained. To this end, by means of the existing electrodes, an additional electrostatic force field is coupled into the floating body. The field regulation control in the electronics is thereby caused to adapt the existing compensation field's strength, in order to maintain the equilibrium of force in the floating body. By means of this method, the characteristic curve of the force field generation may be measured.

As a consequence of another target value presetting for the regulating control, in changing the floating body's position from out of the middle, based on the resulting electrodes capacity values for different intervals between the floating body and the individual electrodes, it is possible to measure again the capacity versus distance characteristic curve of the measurement cell.

By means of this method, the cell can be automatically measured in all three dimensions and calibrated anew.

A further error correction possibility is the direct temperature compensation. On the semiconductor chip, a temperature sensor is integrated as well, and according to predetermined value dependencies, the compensation is performed. Since the whole measurement cell itself only has the size of a chip, there is no temperature gradient which falsifies the compensation.

If a residual error of the cells is of the same kind, the process of combining in a calculation the measurement values of the individual gravimeter circuits carried out in the complete sensor leads to a further compensation effect. The chips for the measurement cells of a sensor therefore should be taken from the same wafer.

If in spite of all correction measures and the advantageously high degree of integration of the measurement cell, the necessary measurement accuracy is not reached, in applying a third floating body having a third density value, a further set of data of input values may be generated for increasing the accuracy.

Figure 3:
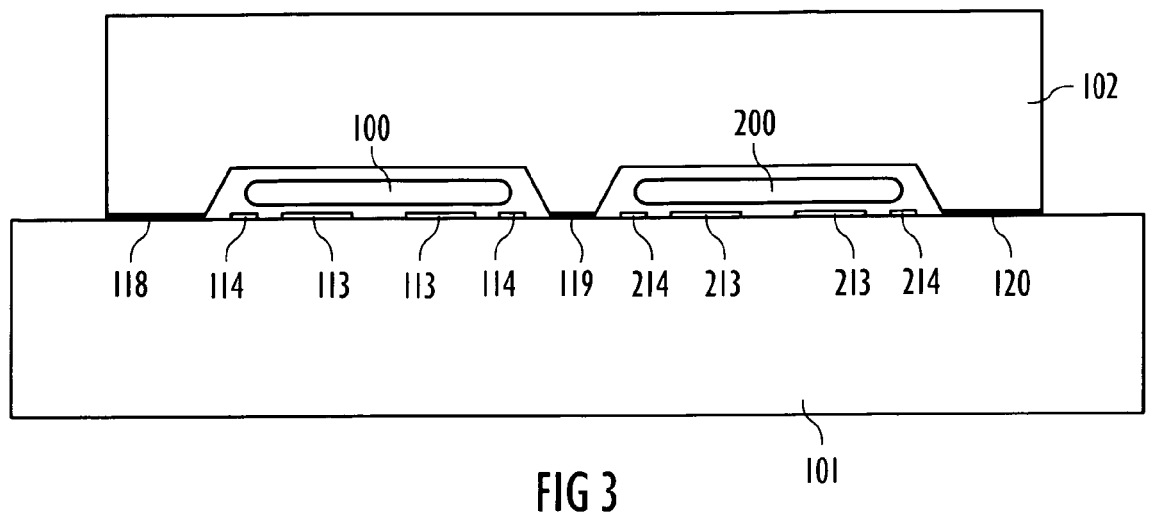
FIG. 3 shows a cross section of a further embodiment example of a gravimeter unit according to the present invention.
Figure 4:
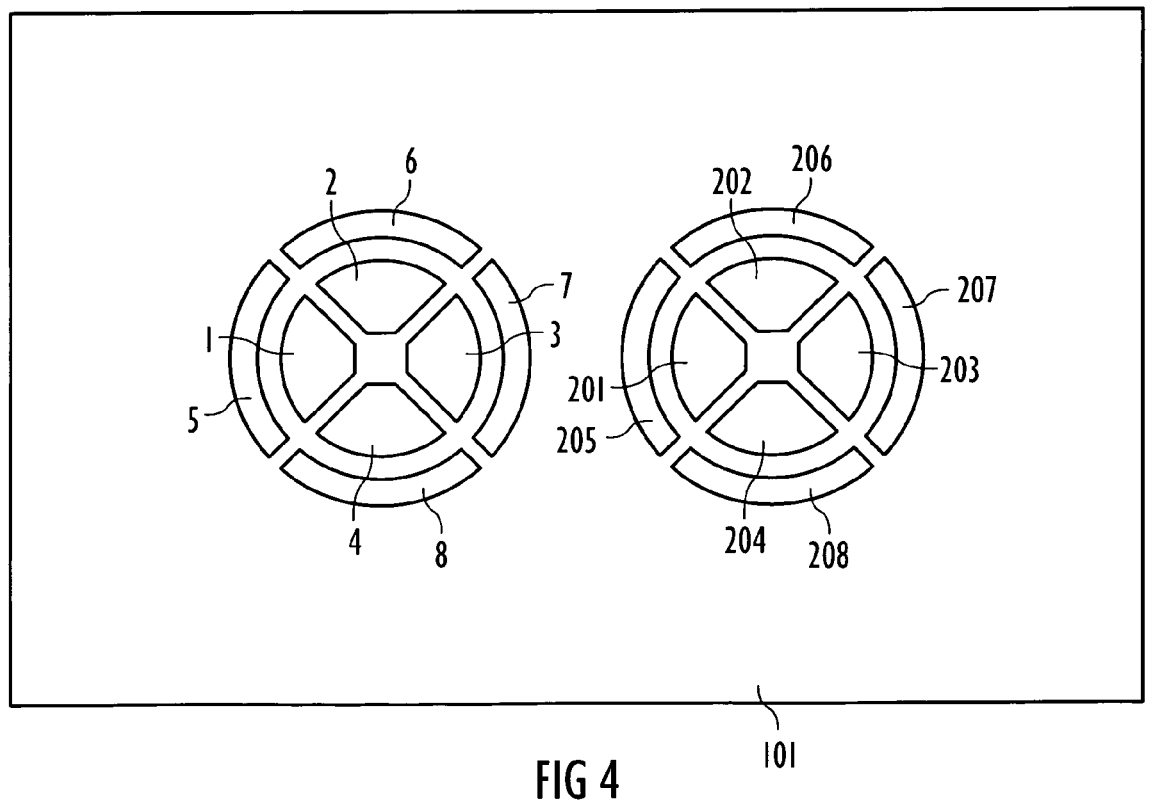
FIG. 4 shows a plan view onto a semiconductor chip having electrodes disposed thereon of the embodiment example of the gravimeter unit shown in FIG. 3.

A second embodiment example of a floating body gravimeter arrangement is shown in the FIGS. 3 and 4.

FIG. 3 shows a cross section of a further embodiment example of a gravimeter unit according to the present invention.

FIG. 4 shows a plan view of a semiconductor chip, having electrodes disposed thereon, of the embodiment example of the gravimeter unit shown in FIG. 3.

If the gravimeter cell is always mounted in such a way that the earth's gravitational field is directed away from the chip surface, the whole electrode structure can be provided on the chip 101. The formed part 102 doesn't need electric terminals then. By means of the outer electrodes 114, 214, there may be created forces acting laterally at the floating body 100, 200. The force component towards the chip surface, being always present at the same time, due to the mounting, acts against the earth's field.

Since the outer electrodes can only produce small forces, the floating body 100, 200 may advantageously be provided as a flat disc of few mass. In that the outer electrodes 114, 214 and the inner electrodes 113, 213 are driven in a combined manner, all needed force components may be generated.

In this arrangement, the formed part 102 may be produced from isolating material or from metal. If a metal formed part is used, it is connected to the circuits mass potential, and therefore acts as electric shielding for the measurement system in the same time. The cell alignment towards the earth's surface may deviate by about ±45 degrees with respect to both spatial dimensions.

Besides the described electrostatic attraction forces, the generation of rejecting forces is also possible. To this end, the floating body 100, 200 has to be from a non-conducting material, like glass or ceramic. Its dielectric constant must be smaller than the one of the liquid used. An electric field created between two electrodes then acts repelling to the floating body.

The combined generation of both kinds of forces is possible in that the non-conducting floating body is provided with a partial metalising. Thereby, the semiconductor chip is enabled, by means of the electrodes provided thereon, to attract the metalised part of the floating body, and to repel the non-metalised part. Thereby, forces in all spatial dimensions can be created, so that a cell alignment is not necessary.

Although in applying attracting electrostatic forces a regulation control of the electrode voltage is mandatory to keep the floating body stable in the floating state, a force field regulation control is principally not necessary, if repelling forces are applied.

An approach of the floating body towards a repelling force field leads to an increase of the field forces, if distance decreases and thereby the electric field strength increases. Therefore, the floating body approaches the electrodes only until gravitational forces and electrical field forces are in equilibrium. From the resulting distances of the floating body with respect to the individual electrodes may be calculated the value of the gravitational field in the 3 spatial dimensions then. The application of an active field regulation control in case of repelling force fields may nonetheless be advantageous, since a constant floating body's position provides advantages for the error compensation.

Figure 5:
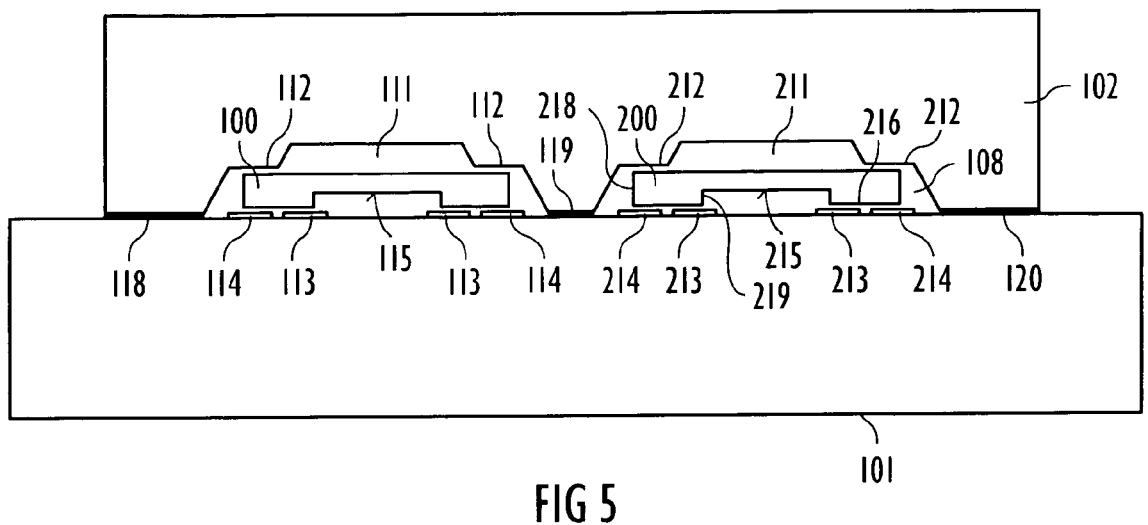
FIG. 5 shows a cross section of an embodiment example of a gravimeter unit according to a further exemplary embodiment of the present invention.

A third embodiment example of a floating body gravimeter arrangement is shown in FIG. 5. In this arrangement as well, the formed part 102 doesn't need an electrode structure. It is possible, to couple in forces of both polarities in all three dimensions to the floating body 100, 200.

A difference to the arrangement described above is that purely metallic floating bodies may be used. To this end, the formed part 102 is provided in a basically conductive manner, and is connected to mass. By means of a special mechanical shaping, it obtains the function of an electrode attracting the floating body. This is obtained in that the effective electrode area is reduced by applying the recess 111, 211 at an annular border zone 112, 212. This border zone 112, 212 has a smaller area than the area sum of all inner electrodes 113, 213 and outer electrodes 114, 214 on the chip. If the chip electrodes 113, 114, 213, 214 are driven by an identical voltage value different with respect to ground potential, there results a higher electrical field line density at the annular electrodes 112, 212 than at the chip electrodes 113, 114, 213, 214. As a consequence thereof, the floating body is attracted by the annular electrode. If the floating body is to be attracted by the chip electrodes, this is effected by use of different voltage potentials between the individual chip electrodes.

FIG. 5 also shows an alternative embodiment for the floating body 100, 200. For increasing the electrostatically generatable lateral forces, the floating bodies 100, 200 each are provided with a recess 115, 215 at their lower side. Thereby, a annular border zone 216 is created which is opposed to the chip electrodes 113, 114, 213, 214. The border zone 216 is provided with an additional inner side area 219 which allows the inner electrodes 113, 213 to couple-in lateral forces into the floating body as well. For the outer electrodes 114, 214 the outer sides area 218 serves for the in-coupling of lateral forces.

There is further the possibility to provide several concentric annular structures at the floating bodies lower side, which each are provided with an own corresponding set of inner electrodes and outer electrodes, in order to be able to generate even higher lateral forces.

By means of suitable driving of repeatedly existent electrode segments, the electrical electrode area effective for the force field generation may be varied for test purposes and regulation control purposes.

Further, there is the possibility to provide the annular structures in different heights, so that each individual ring has another distance to the electrodes at the chip surface. Such an arrangement allows to determine the floating body's position several times, using different slit widths. Based on the known ring height values, the distance measurement values of different distances may be freed from existing error components.

contrary to a variation of the target position value, for measuring the capacity distance characteristic curve, this method has the advantage that the floating body doesn't have to be moved. Furthermore, the electrodes assigned to the individual rings allow the electric field to variably couple-in forces via different slit widths.

Figure 8:
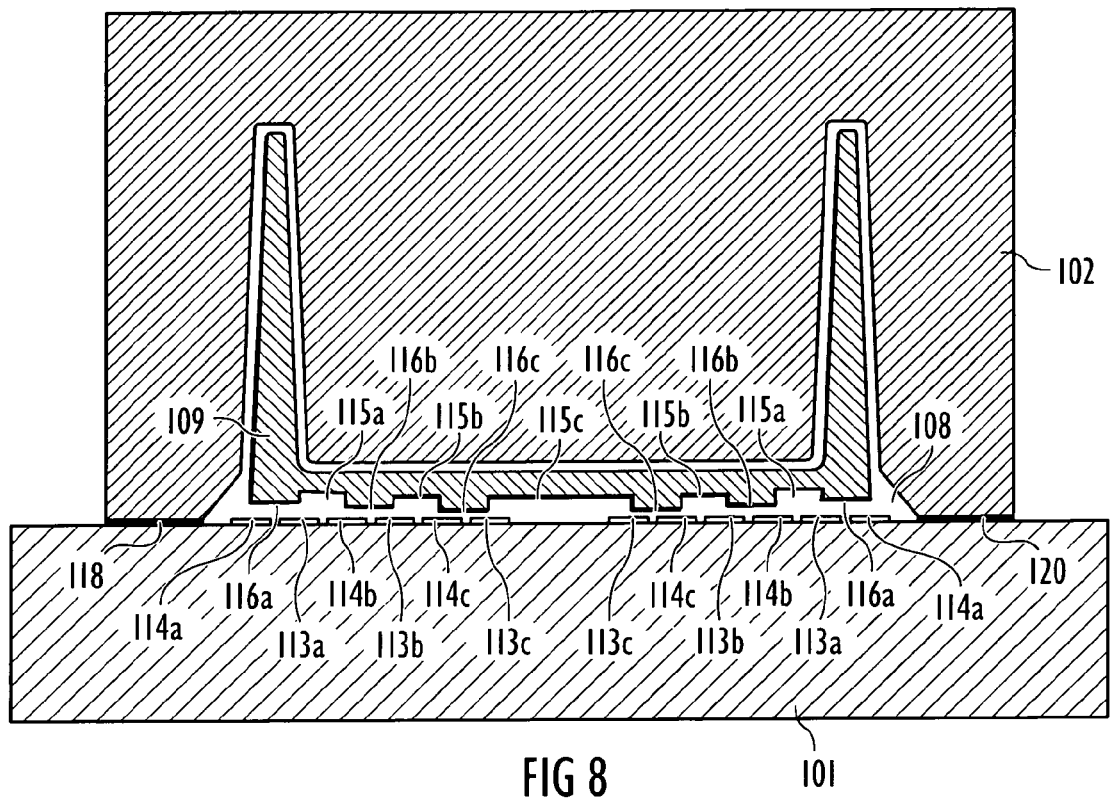
FIG. 8 shows a further embodiment example of a gravimeter according to the present invention.

FIG. 8 shows as fourth embodiment example of a gravimeter having a slit width structured floating body 109, showing three annular units a, b, c. The annular units consist of annular structures 116a, 116b, 116c and recesses 115a, 115b, 115c. On the semiconductor chip 101 there are provided annular outer electrodes 114a, 114b, 114c and inner electrodes 113a, 113b, 113c.

In using a gaseous dielectric having a density being held constant, such a structure has the possibility to derive all measurement values necessary for error compensation from one single floating body. As shown in FIG. 8, in this case, the gravimeter measurement cell does only need one floating state arrangement all together.

If a fluid dielectric is used, the thermal expansion thereof, and the lift error resulting thereof, usually require two floating state arrangements for error compensation. If, however, from the dielectric used the density value may be calculated from its dielectric constant, because for example the electrical susceptibility of the dielectric is proportional to the density value, the lift error compensation may be effected in this way as well.

Determining the dielectric constant is effected by combining in a calculation the capacity values of a sufficient number of electrodes, so that other capacities determining values, like for example floating body position and basic substrate capacity may be eliminated. To this end, an arrangement as shown in FIG. 8 has a sufficient number of electrodes.

In using angular ones instead of round floating bodies, the above named annular structures are accordingly to be replaced by polygon-like structural geometries.

Electrically conductive floating bodies or formed parts besides from metal may alternatively be created from metalised isolating material, like glass or ceramic. The production with precise contour of metal floating bodies or metal formed parts may be effected by stamping re-shaping of suitable pre-forms. Parts based on glass may be formed precisely by pressing in a warm plastic state.

Besides stiff floating bodies, in principle liquid spheres may be used as well. The dielectric may either be gaseous, or may consist of a non-mixing second liquid. Further, it might be thought of using a gas bubble electrostatically held in the floating state in a liquid. The surface tension, which strongly increases when dimensions are small, causes these floating state objects to take on a defined form.

There is further the possibility to surround the floating bodies completely by a formed part arrangement supporting all electrodes, and to couple the semiconductor chip or other electronics by means of conductor connections. It is further possible, to sandwich the floating body between two semiconductor chips. Further, there is the possibility, not to provide the recesses for the floating body in the formed part, but on the semiconductor chip itself.

Figure 9:
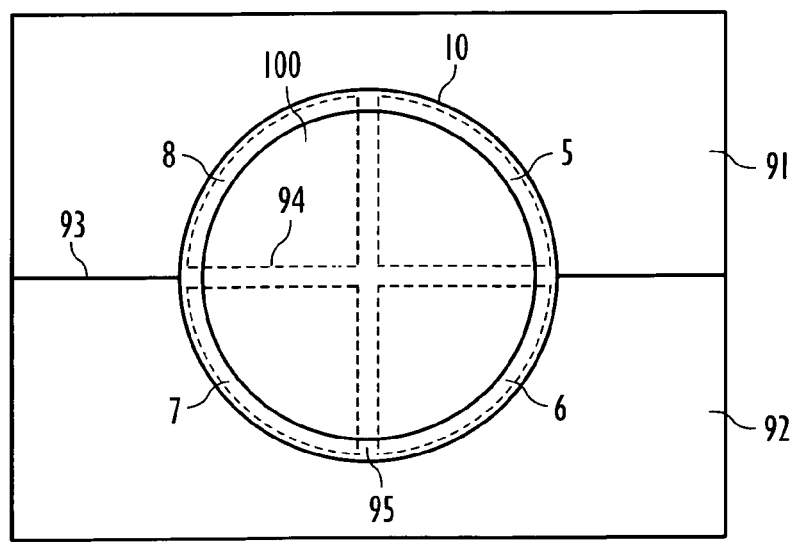
FIG. 9 shows a further embodiment example of a gravimeter according to a further embodiment example of the present invention.

In this respect, FIG. 9 shows a fifth embodiment example of a floating body gravimeter, wherein, for reason of simplicity, only one floating state arrangement is shown. Inside two formed parts 91, 92, being attached to each other at a separation line 93, and each comprising a semi spherical recess 10, there is a spherical floating body 100. Each of the formed parts 91, 92 in its recess 10 bears, for example, four electrodes of quarter sphere calotte shape to be able to couple-in force generating and distance measuring electrical fields into the floating state sphere 100. Of the 4 electrodes per formed part, in FIG. 9 only two electrodes 5, 8 or 6, 7, respectively, are to be seen. Reference sign 94 refers to a electrode extension limit. Reference sign 95 refers to an isolation intermediate space.

The sphere form of the floating body 100 allows for a simplified field regulation control, since due to the rotational symmetry of the sphere body with respect to all three spatial axes, the regulation control of all three rotational degrees of freedom may be omitted, and therefore only the remaining three translational degrees of freedom are to be controlled.

Since both formed parts 91, 92 generally are of passive nature, and therefore, by means of stray capacity containing conductor connections have to be connected to an external electronics, floating state arrangements having an electrode supporting semiconductor chip are especially advantageous.

In the floating body gravimeter, preferably electrical fields are applied for force generation and distance measurement. These can be generated with minimal effort of energy, are easy to shield, and the required electrode arrangements are cost effectively and may very precisely be produced as well as integrated.

Alternatively, magnetic fields may also be applied. To this end, the floating body is surrounded by electromagnetic coils. A floating body consisting of ferromagnetic material, like iron or ferrite ceramics is attracted by the magnetic field of the coils. Bodies from permanent magnetic materials, dependent on the fields polarity of the coils, may be attracted or repelled. Bodies from non-magnetic, but electrically conductive material, like for example aluminium, may be repelled from these, due to generation of eddy current(s) by the alternating magnetic fields of the coils.

The distance measurement as well may be effected by means of magnetic fields. From the inductivity values of the coils, as well as from the magnetic coupling between the coils, the distance to a ferromagnetic floating body may be obtained. In case of an ohmic conductive body, the distance measurement may be effected by analysis of the resistive component of the alternating current impedance of the coils. Fields emanating from the floating body, or field amplitudes modified by it, also represent a measure for the distance. The measurement of field strength may for example be effected by means of magneto-resistive hall sensor elements or GMR sensor elements.

In applying magnetic methods, a sufficient shielding of the measurement cell with respect to surrounding magnetic fields has to be provided.

The floating body's position may also be detected in a conductive manner. To this end, an ohmic conductive dielectric has to be used. The then occurring resistance value between individual conductive measurement electrodes represents a measure for the floating body's distance to the electrodes. If a dielectric is used which is not too low ohmic, a simultaneous resistive and capacitive distance measurement may be carried out. Similarly, the possibility for creating electrical force fields remains.

Furthermore, an optical distance measurement is possible as well. This may for example be effected by analysis of the shielding effect of the floating body to a light beam by means of measuring the amplitude of light of a point light source being scattered back by the body, as well as in an interferometric manner.

In principal, there is further the possibility to couple forces into the floating body in a mechanical manner, for example by blowing against or flowing around the floating body by means of fluid which may replace or be the dielectric, as well as to draw conclusions on the body's position from the slit width dependent flow resistance of the arrangement.

For suppression of the disturbing influence of ambiance vibrations to the gravimeter output signal, there exist different possibilities.

It is advantageous to embed the measurement cell carrier in a damping material, or respectively, to inhibit the transmission of vibration from the sensors housing to the measurement cell by means of other measures.

Further, in case a liquid dielectric is used, the flow-caused liquid-related friction may be exploited for suppression of vibration.

In case of measurement cells having a gaseous dielectric, a vibration damping by means of the dielectric may also be effected by suitable shaping of floating body and formed part.

To this end, the floating body is provided in such a manner that during motions in each of the three spatial dimensions a preferably big volume extrusion of the gaseous dielectric is effected, but in the same time, it only has a minimal intrinsic weight.

To this end, the floating body 100 may be designed cup-like, hat-like or semi-closed cylindrical, as shown in FIG. 8. Further, embodiments as completely closed hollow bodies are possible. The gas volume displaced during movements has to flow out through the narrow slit between the floating body and the formed part towards the opposite side, so that only slow movements are possible.

If the floating bodies are metallic, eddy currents may alternatively be applied for vibration damping. To this end, a permanent magnet is mounted at the formed part, subjecting the electrically conductive floating body to an inhomogeneous magnetic field. Each movement of the floating body leads to generation of eddy currents, the intrinsic magnetic field of which according to Lenz's law acts contrary to the motion creating them.

There is further the possibility to compensate vibration forces in real time by means of electrostatic forces of the electrodes. As mechanical vibrations usually occur in the frequency range from 1 to 1000 Hz, but since the regulation control of the electrostatic fields may occur at frequencies of several 100 MHz, the electrical compensation forces are more than five powers of ten faster than the highest mechanical vibration frequencies.

Since vibrations represent an alternating value, whereas the gravitational field is a non-alternating field value, the intended separation may be effected by vibration suppression and measurement value integration.

Due to the extensive diagnosis functions within the frame of error correction, the floating body gravimeter cell is a self supervised measurement system. The sensor operator obtains a reliable notice of dysfunction. Further, a signal prior to malfunction may be output as warning signal in case of parameter degradation.

Due to the tinyness of the measurement cells, in case of special safety requirements, the construction of completely redundant sensors is possible without increase of the outer dimensions. According to the principle, there is no influencing of the measurement cells or complete sensors among each other.

By arranging numerous measurement cells in form of a matrix, the realisation of imaging sensors may also be thought of.

Besides the application in filling level sensors, the floating body gravimeter according to the invention, and the above described gravitational field analysis methods may, in an advantageous manner, also be applied for other applications of the qualitative and quantitative detection of masses or their volume(s), respectively. With only one type of gravimeter circuit, all kinds of measurement applications may be covered, since the earth's gravitational field represents the dominating value in all cases.

Furthermore, besides the determination of gravitational accelerations, the floating body measurement cell according to the invention may also be applied for measuring accelerations of another kind. In contrary to known acceleration sensors, it has advantages especially in measuring very small acceleration values. Therefore it may be applied for example in inertial navigation systems of airplanes, submarines, and airborne objects of the most diverse kind.

In addition, it shall be noted, that "comprising" does not exclude other elements or steps, and that "a" or "an" does not exclude a plurality. It shall further be noted that features or steps which were described referring to one of the above embodiment examples, may as well be used in combination with other features or steps of other above described embodiment examples. It should also be noted, that any reference signs in the claims shall not be construed as limiting the scope of the claims.

I claim:

1. A method for filling level measurement of a filling good in a container on the basis of a gravitational field analysis, the method comprising the steps of:
    determination of first data corresponding to a first gravitational field strength at a first location by a first gravimeter unit;
    determination of second data corresponding to a second gravitational field strength at a second location by a second gravimeter unit; and
    calculating a filling level of the filling good on the basis of the determined first and second data.

2. The method according to claim 1, further comprising the steps of:
    generating a field by a source; and
    detecting a first position of a first floating body of the first gravimeter unit by a first detector;
    wherein the first floating body is contactlessly held in a floating state by a field generated by the source; and
    wherein the first data are determined on the basis of the detected first position or the generated field.

3. The method according to claim 2, wherein the field is selected from the group consisting of an electric field, a magnetic field, an electromagnetic field and a mechanical flow field.

4. The method according to claim 2, wherein the first detector is adapted for at least one of capacitive, inductive, conductive and optical detection of the first position of the first floating body.

5. The method according to claim 1, wherein calculating of the filling level comprises a calculation of a gradient of a gravitational field in a neighborhood of the filling good on the basis of the first data and the second data.

6. The method according to claim 1, wherein within a sensor the first and the second gravimeter units are disposed at fixed positions with respect to each other.

7. The method according to claim 1, further comprising the step of:
    rotating the first gravimeter unit about an axis or translating the first gravimeter unit along an axis;
    wherein, during a rotation or translation, the first gravimeter unit is adapted for measuring a first set of volume data comprising the first data.

8. The method according to claim 1, further comprising the step of:
    transmitting the first data and the second data via a communication interface to an analyzing unit.

9. A computer readable medium, onto which a computer program for filling level measurement of a filling good in a container on the basis of a gravitational field analysis is stored, wherein the computer program, when executed on a processor, instructs the processor to execute the following operations:
    determination of first data corresponding to a first gravitational field strength at a first location by a first gravimeter unit; and
    determination of second data corresponding to a second gravitational field strength at a second location by a second gravimeter unit;
    calculating a filling level of the filling good on the basis of the determined first and second data.

* * * * *